UNITED STATES PATENT OFFICE.

ROBERT HATFULL, OF DEPTFORD, ENGLAND, ASSIGNOR TO DAVID L. EVANS, OF NEW YORK, N. Y.

IMPROVEMENT IN COMPOSITIONS FOR PREVENTING INCRUSTATIONS IN STEAM-BOILERS.

Specification forming part of Letters Patent No. 143,240, dated September 30, 1873; application filed August 1, 1873.

*To all whom it may concern:*

Be it known that I, ROBERT HATFULL, of Deptford, in the county of Kent, England, have invented a new and useful Composition for Preventing Incrustation in Steam-Boilers, of which the following is a specification:

My invention consists in a composition formed by mixing the several ingredients or substances hereinafter mentioned in about the proportions specified, which said composition so formed I introduce in a fluid state into the boiler for the purpose of preventing incrustation thereupon.

In order to form this composition I first take lac-sulphur and precipitate of lime, about equal quantities, which I thoroughly mix together. This mixture I term kaso. I then take of this mixture, which I have named kaso, from forty to sixty pounds; carbonate of potash, from four to twenty-four pounds; animal charcoal, four pounds; terra-japonica, (cutch,) two pounds; which said ingredients I dissolve together in twenty gallons of common water. The fluid thus formed I introduce into the steam-boiler in the proportion of about half a pint thereof to every eight hundred gallons of feed-water supplied to the boiler.

The proportions of the several ingredients, and the proportion of the fluid compound formed thereby, may be varied to suit different qualities of water which may be used; and I may mention that oak-bark may be substituted for the terra-japonica, if desired, without materially altering or changing my invention.

This composition has been found, by actual and extensive experiments and use, to be very effectual as a preventive of incrustation in steam-boilers, and also in removing incrustation therefrom after it had been formed.

What I claim as my invention is—

A composition formed of the within-mentioned ingredients, in about the proportions specified, for the purposes set forth.

ROBERT HATFULL.

Witnesses:
ARTHUR N. MCLELLAN,
JOHN W. P. JAURALDE.